United States Patent
Carlson (10) Patent No.: US 9,482,202 B2
(45) Date of Patent: Nov. 1, 2016

(54) TORQUE COMPENSATION FOR DETONATION

(71) Applicant: Tula Technology Inc., San Jose, CA (US)

(72) Inventor: Steven E. Carlson, Oakland, CA (US)

(73) Assignee: Tula Technology, Inc., San Jose, CA (US)

( * ) Notice: Subject to any disclaimer, the term of this patent is extended or adjusted under 35 U.S.C. 154(b) by 95 days.

(21) Appl. No.: 14/568,408

(22) Filed: Dec. 12, 2014

(65) Prior Publication Data

US 2015/0211472 A1 Jul. 30, 2015

Related U.S. Application Data

(60) Provisional application No. 61/931,476, filed on Jan. 24, 2014.

(51) Int. Cl.
| | |
|---|---|
| *F02D 41/02* | (2006.01) |
| *F02P 5/152* | (2006.01) |
| *F02D 17/02* | (2006.01) |
| *F02D 41/00* | (2006.01) |

(52) U.S. Cl.
CPC ............ *F02P 5/1522* (2013.01); *F02D 17/02* (2013.01); *F02D 41/0087* (2013.01); *F02D 41/027* (2013.01); *F02P 5/1523* (2013.01); *Y02T 10/46* (2013.01)

(58) Field of Classification Search
CPC . F02P 5/1522; F02P 5/1523; F02D 41/0087; F02D 41/027; F02D 17/02; Y02T 10/46
USPC .................................................. 123/406.21
See application file for complete search history.

(56) References Cited

U.S. PATENT DOCUMENTS

| | | | |
|---|---|---|---|
| 4,434,767 A | 3/1984 | Kohama et al. | |
| 4,489,695 A | 12/1984 | Kohama et al. | |
| 4,509,488 A | 4/1985 | Forster et al. | |
| 4,625,691 A | 12/1986 | Komurasaki et al. | |
| 5,377,631 A | 1/1995 | Schechter | |
| 5,553,575 A * | 9/1996 | Beck | F02B 37/16 123/198 F |
| 5,581,022 A | 12/1996 | Sprague et al. | |
| 6,158,411 A | 12/2000 | Morikawa | |
| 6,382,193 B1 * | 5/2002 | Boyer | F01L 9/04 123/198 F |

(Continued)

FOREIGN PATENT DOCUMENTS

EP     1022450 A2 *  7/2000  ............. F02D 17/02

OTHER PUBLICATIONS

International Search Report dated Apr. 17, 2015 from International Application No. PCT/US2015/010185.

(Continued)

*Primary Examiner* — Joseph Dallo
(74) *Attorney, Agent, or Firm* — Beyer Law Group LLP (57) ABSTRACT

In one aspect, a method for mitigating detonation in a skip fire engine control system is described. The working chambers of the engine are operated in a skip fire manner to deliver a desired torque. One or more detonations are detected in the engine. In response to the detection of the one or more detonations, the spark timing for one or more of the working chambers is retarded. Additionally, the firing fraction used to operate the engine is increased. The increase in the firing fraction helps to compensate for torque lost due to the retarding of the spark timing.

18 Claims, 4 Drawing Sheets

(56) References Cited

U.S. PATENT DOCUMENTS

| | | | |
|---|---|---|---|
| 6,619,258 B2 | 9/2003 | McKay et al. | |
| 6,763,297 B1 | 7/2004 | Stahl et al. | |
| 7,063,062 B2 | 6/2006 | Lewis et al. | |
| 7,066,136 B2 | 6/2006 | Ogiso | |
| 7,086,386 B2 | 8/2006 | Doering | |
| 7,159,568 B1* | 1/2007 | Lewis | F02D 19/084 123/299 |
| 7,198,029 B1 | 4/2007 | Wong et al. | |
| 7,314,033 B2* | 1/2008 | Cohn | F02B 47/04 123/198 A |
| 7,503,312 B2 | 3/2009 | Surnilla et al. | |
| 7,930,087 B2 | 4/2011 | Gibson et al. | |
| 7,946,275 B2 | 5/2011 | McDonald et al. | |
| 8,099,224 B2 | 1/2012 | Tripathi et al. | |
| 8,214,127 B2 | 7/2012 | Whitney et al. | |
| 2005/0199220 A1* | 9/2005 | Ogiso | F02D 13/06 123/481 |
| 2005/0216132 A1 | 9/2005 | Masters et al. | |
| 2007/0119413 A1* | 5/2007 | Lewis | F02D 41/0025 123/295 |
| 2007/0119414 A1* | 5/2007 | Leone | F02D 19/0684 123/295 |
| 2007/0119421 A1* | 5/2007 | Lewis | F01N 11/002 123/431 |
| 2007/0119425 A1* | 5/2007 | Lewis | F02B 63/02 123/478 |
| 2010/0050993 A1 | 3/2010 | Zhao et al. | |
| 2011/0213541 A1 | 9/2011 | Tripathi et al. | |
| 2011/0288734 A1 | 11/2011 | Phillips et al. | |
| 2012/0175876 A1* | 7/2012 | Pendray | F02D 19/02 290/41 |
| 2012/0285161 A1 | 11/2012 | Kerns et al. | |
| 2014/0000555 A1* | 1/2014 | Glugla | F02D 41/008 123/305 |
| 2014/0350823 A1 | 11/2014 | Glugla | |
| 2015/0152796 A1* | 6/2015 | Zhang | F02D 41/0002 701/103 |
| 2016/0017824 A1* | 1/2016 | Touchette | F02D 41/0087 123/481 |
| 2016/0053697 A1* | 2/2016 | Pirjaberi | F02D 17/02 123/406.45 |

OTHER PUBLICATIONS

Written Opinion dated Apr. 17, 2015 from International Application No. PCT/US2015/010185.

* cited by examiner

TORQUE COMPENSATION FOR DETONATION

CROSS REFERENCE TO RELATED APPLICATIONS

This application claims priority to U.S. Provisional Patent Application No. 61/931,476, entitled "Torque Compensation for Detonation," filed Jan. 24, 2014, which is incorporated by reference herein in its entirety for all purposes.

FIELD OF THE INVENTION

The present invention relates to skip fire engine technologies. In particular, the present invention relates to techniques for managing and mitigating detonation in a skip fire engine control system.

BACKGROUND

Most vehicles in operation today are powered by internal combustion (IC) engines. Internal combustion engines typically have a plurality of cylinders or other working chambers. An air-fuel mixture is delivered to each cylinder. In a spark ignition engine, the mixture is then ignited using a spark from a spark plug. Ideally, the ignition of the fuel-air mixture should propagate from the spark through the mixture in an even, controlled manner. The resulting combustion drives the piston in the cylinder and generates torque for the engine.

To obtain optimum efficiency the spark is generally fired in advance of the top dead center (TDC) piston position. The degree of advance depends on the cylinder load and engine speed and can typically range from 60° before TDC to 10° after TDC. Generally engines running at higher engine speeds will operate with more spark advance, i.e. the spark occurs farther before TDC. Engines running at higher cylinder load will operate with less spark advance or a retarded spark.

In some cases, however, the combustion process does not proceed in an orderly fashion. For example, the fuel-air mixture may spontaneously combust outside of the flame envelope generated by the spark. In other words, high pressure and temperature in the cylinder, rather than the spark itself, may cause the air-fuel mixture to combust. This phenomenon is generally referred to as detonation. The use of low grade fuels tends to increase the likelihood of spontaneous combustion. Such spontaneous combustions are undesirable, since they generate a sharp increase in pressure within the working chamber. Repeated detonations can overheat and damage the engine.

In many conventional vehicle designs, there are systems for mitigating detonation. Some systems are designed to detect detonations and automatically retard the spark timing. That is, the sparking of the air-fuel mixture is performed later than before. This tends to weaken future combustions and reduce heat and pressure in the working chamber.

A problem with the above approach, however, is that it results in a drop in engine output. In response to the power loss, a driver may further depress the accelerator pedal. The depression of the accelerator pedal increases the cylinder load and may again drive up pressure and temperature levels in the working chambers and increase the likelihood of another detonation.

SUMMARY

In one aspect, a method for mitigating detonation in a spark ignition skip fire engine control system is described. The working chambers of the engine are operated in a skip fire manner to deliver a desired torque. One or more detonations are detected in the engine. In response to the detection of the detonation(s), the spark timing for one or more of the working chambers is retarded. Additionally, the firing fraction used to operate the engine is increased. The increase in the firing fraction helps to compensate for torque lost due to the retarding of the spark advance causing the delivered torque to substantially match the requested torque.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The present invention relates to a system for handling detonation in a spark ignition, skip fire engine control system. As indicated in the Background, a common approach to handling detonation in prior art engine designs is to retard the spark timing. Retarding the spark timing has the benefit of reducing heat and pressure in the working chamber, which in turn reduces the likelihood of future detonations.

One problem, however, with retarding the spark timing is that it reduces the torque output of the engine. When a driver detects the drop in power, he or she may be inclined to further depress the accelerator pedal in order to increase output. However, this can defeat the purpose of retarding the spark timing, since such an action increases the amount of air and fuel delivered to each fired cylinder, resulting in stronger combustions and higher temperatures and pressures. As a result, the likelihood of a future detonation may be increased.

Various embodiments of the present invention relate to techniques for compensating for the aforementioned reduction in torque output in a skip fire engine control system. In general, skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional variable displacement engine operation in which a fixed set of the cylinders are deactivated during certain low-load operating conditions.

To compensate for the drop in torque output resulting from a detonation and a corresponding retarding of the spark timing, various implementations involve increasing a firing fraction or a ratio of firings to total firing opportunities. The increase in the firing fraction helps compensate for the torque lost due to the adjustment of the spark timing, causing the delivered torque to substantially match the requested torque. An additional benefit is that the increase in the firing fraction generally tends to cause a reduction in the mass air charge, or the amount of air delivered to each fired working chamber. The reduction in air decreases cylinder output and helps reduce heat and pressure in the working chamber. Thus, the risk of future detonations can be reduced.

Figure 1:
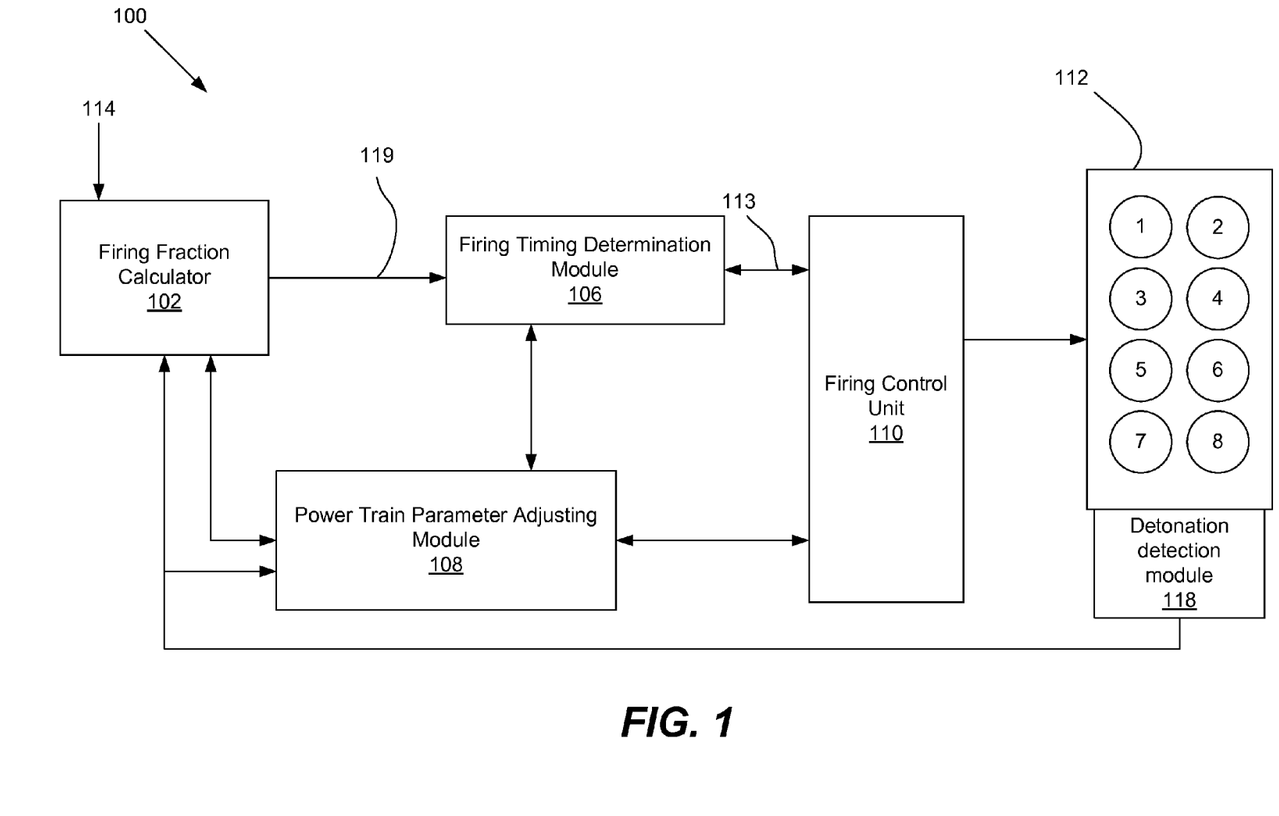
FIG. 1 is a block diagram illustrating an engine controller according to a particular embodiment of the present invention.

Referring initially to FIG. 1, an engine controller 100 according to a particular embodiment of the present invention will be described. The engine controller 100 receives an input signal 114 and includes a detonation detection module 118, a firing fraction calculator 102, a firing timing determination module 106, a power train parameter adjusting module 108 and firing control unit 110. The firing control unit communicates with and operates an engine 112.

The detonation detection module 118 includes one or more sensors, mechanisms or modules arranged to help detect a detonation in the engine. In some implementations, for example, the detonation detection module includes one or more sensors that are positioned on the engine and that are arranged to monitor the frequencies of vibrations that propagate from the working chambers through the engine block. The detonation detection module 118 analyzes the sensor data and determines whether a detonation has occurred (e.g., based on whether the detected frequencies exceed particular predetermined thresholds.) The detonation detection module 118 may include any known technology, mechanism or sensor used to detect a detonation. If a detonation has taken place, the detonation detection module sends a corresponding signal to the power train parameter adjusting module 108 and the firing fraction calculator 102. The power train parameter adjusting module may retard the spark advance by a pre-set amount or a value determined from the engine operating parameters. Typical values of spark timing retard can range from 1° to 8°, but both larger or smaller values are possible. Spark retardation will tend to reduce the torque generated by the working chamber.

Some implementations allow the detonation detection module 118 to identify the working chamber in which a particular detonation took place. Based on the timing of the detected detonations, cam timing and/or a known firing sequence, the origin of each detonation (i.e., which working chamber was involved in the detonation) can be determined. Different operations (e.g., different amounts of spark retard) can then be applied to different working chambers, based on the characteristics of the detonations that have taken place in each working chamber.

It should be appreciated that the term, "detonation," as used in this application, is intended to refer to any spontaneous combustion of an air-fuel mixture within the working chamber. In various embodiments, for example, a detonation refers to a spontaneous combustion in the working chamber that occurs outside of the combustion front generated by a spark in a spark-ignition engine. In some contexts, the term, "detonation," is understood to encompass concepts such as knocking, spark knock, pinging, and/or auto-ignition.

The firing fraction calculator 102 receives data from the detonation detection module 118, the power train parameter adjusting module 108, and an input signal 114. In the embodiment of FIG. 1, the input signal 114 is treated as a request for a desired engine output or torque. The signal 114 may be received or derived from an accelerator pedal position sensor (APP) or other suitable sources, such as a cruise controller, a torque calculator, an ECU, etc. An optional preprocessor may modify the accelerator pedal signal prior to delivery to the engine controller 100. However, it should be appreciated that in other implementations, the accelerator pedal position sensor may communicate directly with the engine controller 100.

The firing fraction calculator 102 receives input signal 114 (and when present other suitable sources) and is arranged to determine a skip fire firing fraction that would be appropriate to deliver the desired output. The firing fraction calculator 102 also is arranged to respond to the detection of a detonation. In various embodiments, for example, if the firing fraction calculator 102 receives a signal from the detonation detection module 118 indicating that a detonation has taken place, the firing fraction calculator 102 will automatically increase the firing fraction used to operate the working chambers of the engine. The increase in the firing fraction occurs in concert with the spark retardation controlled by power train parameter adjusting module 108. This helps compensate for the torque lost when the power train parameter adjusting module 108 retards the spark to help mitigate the risk of detonation. The compensation results in the delivered torque being substantially equal to the requested torque.

The power train parameter adjusting module 108 cooperates with the firing fraction calculator 102 and the detonation detection module 118. The power train parameter adjusting module 108 directs the firing control unit 110 to set selected power train parameters appropriately to insure that the actual engine output substantially equals the requested engine output at the commanded firing fraction. Additionally, the power train parameter adjusting module 108 responds to the detection of a detonation in the engine by setting engine parameters in order to reduce the likelihood of future detonations. In various embodiments, for example, the power train parameter adjusting module 108, after receiving a signal from the detonation detection module 118 indicating that a detonation has taken place, directs the firing control unit 110 to retard the spark timing for one or more working chambers. The retarding of the spark timing helps lower the temperature and pressure in the corresponding working chambers. In other embodiments, the power train parameter adjusting module 108 may increase the fuel/air ratio so there is an excess of fuel. This has the effect of cooling the cylinder charge, reducing the propensity for detonation. The power train parameter adjusting module 108 may be responsible for setting any suitable engine setting (e.g., mass air charge, fuel injection. spark timing, cam timing, valve control, etc.) to help ensure that the actual engine output matches the requested engine output and to help mitigate the risk of future detonations.

The power train parameter adjusting module 108 may adjust any suitable engine or operating parameter to help mitigate the risk of future detonations. That is, any parameter that reduces the intensity of combustions or reduces the heat and/or pressure in a working chamber may be adjusted in response to the detection of a detonation. In a preferred embodiment, the spark timing is retarded from its normal position. In various embodiments, the spark timing normal position may be defined by a detonation-limited maximum brake torque table that compiles the acceptable spark advance as a function of engine speed and cylinder load. Alternatively, the normal spark advance may be determined through some other means. Some implementations involve retarding the spark timing for different working chambers to different degrees based on which working chambers the detonations took place in, the number of detonations detected over a period of time, and/or the characteristics (e.g., vibration frequency) of each detonation. This information can be received from the detonation detection module 118.

The firing timing determination module 106 receives the commanded firing fraction 119 from the firing fraction calculator 102 and is arranged to issue a sequence of firing commands that cause the engine to deliver the percentage of firings dictated by the commanded firing fraction 119. The sequence of firing commands (sometimes referred to as a drive pulse signal 113) outputted by the firing timing determining module 106 are passed to the firing control unit 110 which orchestrates the actual firings. The firing control unit 110 also receives signals from the power train parameter adjusting module 108 indicating desired changes in spark advance or other engine parameters. The firing control unit 110 orchestrates these changes in the engine 112.

It should be appreciated that the engine controller 100 is not limited to the specific arrangement shown in FIG. 1. One or more of the illustrated modules may be integrated together. Alternatively, the features of a particular module may instead be distributed among multiple modules. The engine controller may also include additional features, modules or operations based on other co-assigned patent applications, including U.S. Pat. Nos. 7,954,474; 7,886,715; 7,849,835; 7,577,511; 8,099,224; 8,131,445; and 8,131,447; U.S. patent application Ser. Nos. 13/774,134; 13/963,686; 13/953,615; 13/953,615; 13/886,107; 13/963,759; 13/963,819; 13/961,701; 13/963,744; 13/843,567; 13/794,157; 13/842,234; 13/004,839, 13/654,244 and 13/004,844; and U.S. Provisional Patent Application Nos. 61/080,192; 61/104,222; and 61/640,646, each of which is incorporated herein by reference in its entirety for all purposes. Any of the features, modules and operations described in the above patent documents may be added to the illustrated engine controller 100. In various alternative implementations, these functional blocks may be accomplished algorithmically using a microprocessor, ECU or other computation device, using analog or digital components, using programmable logic, using combinations of the foregoing and/or in any other suitable manner.

Figure 2:
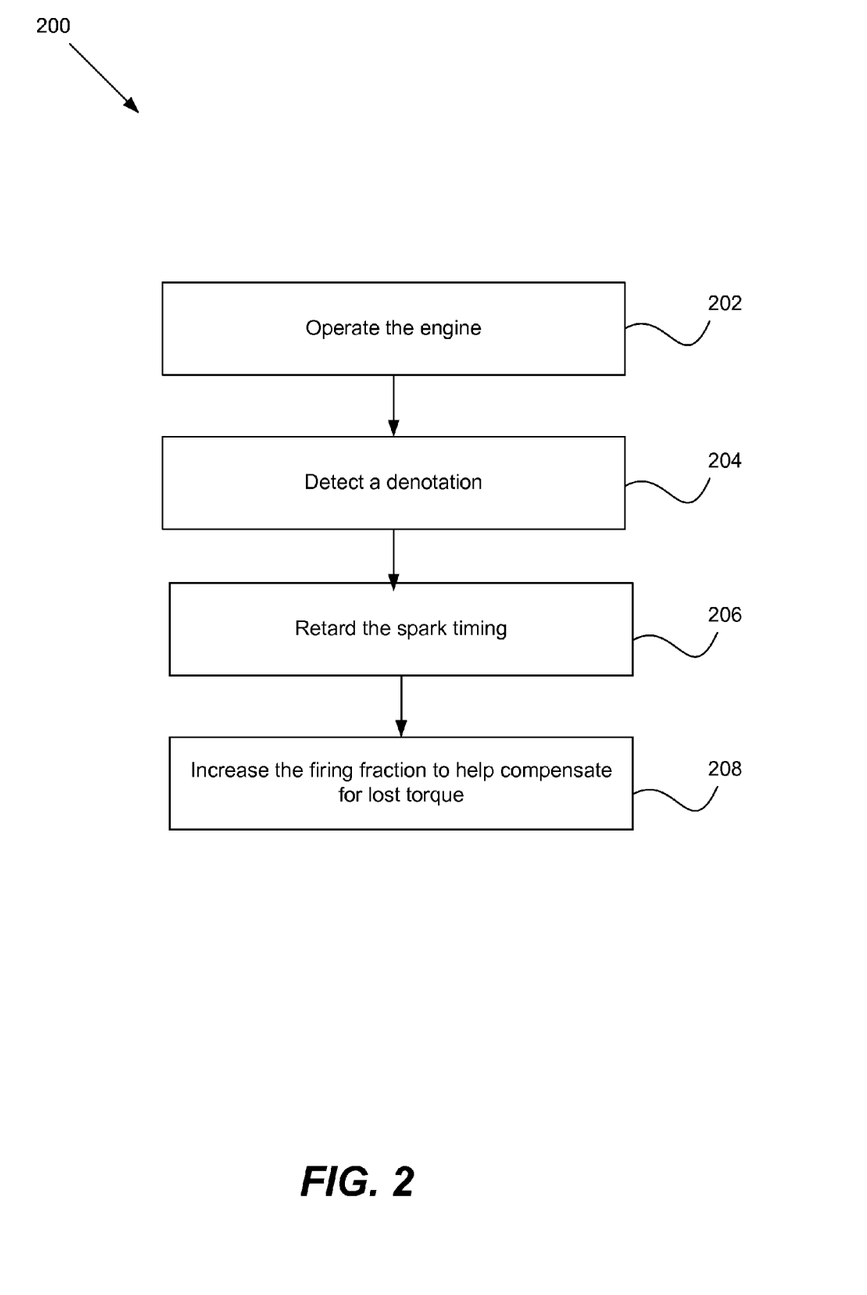
FIG. 2 is a flow diagram illustrating a method for handling detonation according to a particular embodiment of the present invention.

Referring next to FIG. 2, a method for handling detonation in a skip fire engine control system according to a particular embodiment of the present invention will be described. Initially, at step 202, the working chambers of the engine 112 are operated in a skip fire manner. That is, the working chambers of the engine are fired in accordance with a skip fire firing sequence generated by the firing timing determination module 106. The skip fire firing sequence is based on a commanded firing fraction 119, which is generated by the firing fraction calculator 102.

During the skip fire operation of the engine, the detonation detection module 118 detects a detonation (step 204.) For example, one or more sensors on the engine may detect particular vibration characteristics or frequencies that indicate a detonation has taken place. Some embodiments involve generating a visible alert or sound (e.g., a warning light or symbol displayed on a display) to a driver or operator of the engine to indicate that a detonation has occurred. If the degree of spark retardation required to avoid detonation is beyond some limit, an error signal may be generated in the on-board-diagnostic (OBD) system of the vehicle. The operator is thus informed that the vehicle or engine may be in need of repair. In response to the detonation, the power train parameter adjusting module 108 retards the spark timing for one or more working chambers (step 206.) In various embodiments, the retarding of the spark timing only takes place on those working chambers in which a detonation was detected. The amount of spark advance may be adjusted dynamically in response to vibration characteristics of the detected detonation and may differ for different working chambers, depending on the detonation history and characteristics for each working chamber.

At step 208, the firing fraction calculator 102 increases the firing fraction. That is, an adjusted firing fraction is generated, which is higher than the earlier firing fraction that was used to operate the engine when the detonation was detected. Generally, the increase in the firing fraction is calibrated to completely or at least partially compensate for the estimated drop in engine torque or output resulting from the retarding of the spark timing. In various embodiments, the increase in the firing fraction is automatic. That is, the increase does not involve and should be distinguished from an increase in the firing fraction that was (directly) caused by an increase in the desired torque (e.g., as represented by input 114 of FIG. 1, driver input and/or the depression of the accelerator pedal.) The adjusted firing fraction is delivered to the firing timing determination module 106, which generates a firing sequence to operate the working chambers of the engine in a skip fire manner.

In some embodiments, the increasing of the firing fraction involves selecting firing fractions from a library of predetermined firing fractions. In various implementations, for example, before a detonation is detected, a first firing fraction may be selected from the library and used to operate the engine in a skip fire manner. After the detonation is detected, the spark timing is retarded and a second, higher firing fraction is selected from the library and used to operate the engine in a skip fire manner. The second firing fraction is selected to help compensate for the torque loss corresponding to the retarding of the spark timing. Under some conditions, each selected, predetermined firing fraction may deliver an amount of torque that is close to, but does not exactly match the desired amount of torque. As a result, the power train parameter adjusting module 108 is arranged to adjust one or more engine settings (e.g., throttle, manifold absolute pressure, spark timing, cam timing, etc.) so that the delivered torque matches the desired torque.

Figure 3:
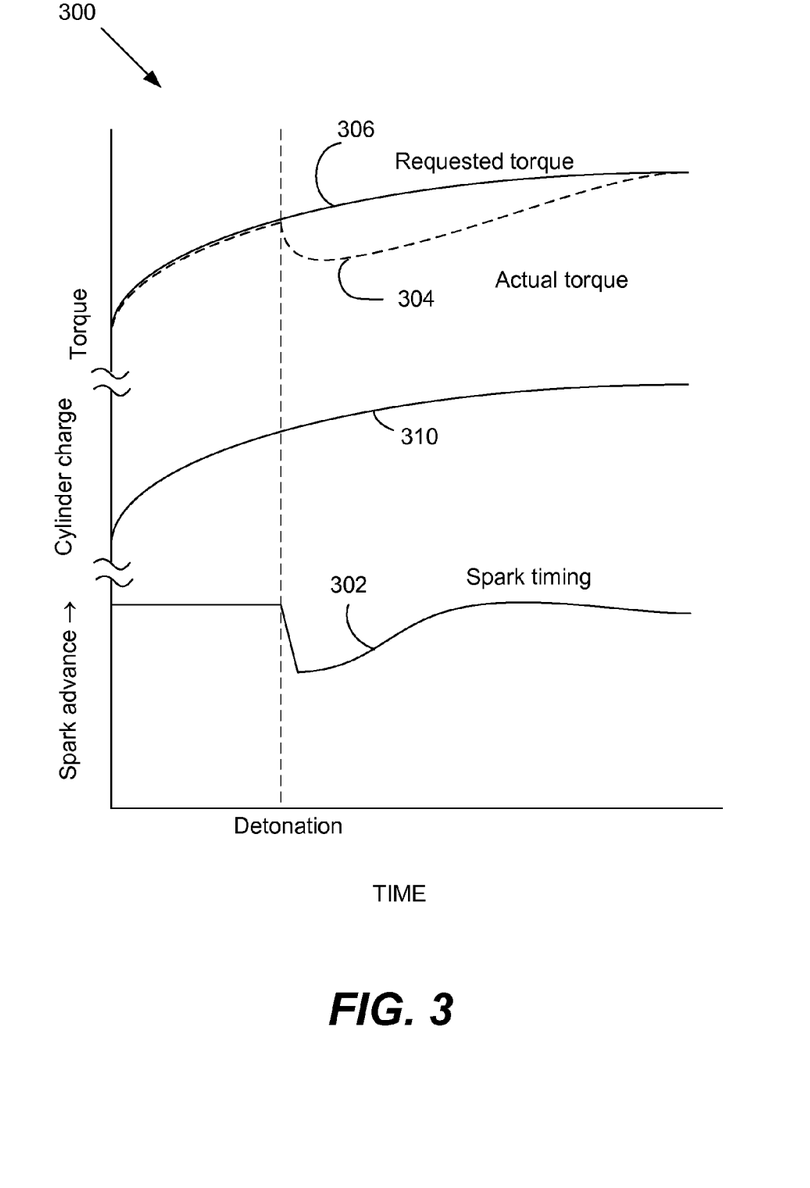
FIG. 3 is a graph illustrating example engine characteristics of a prior art engine.
Figure 4:
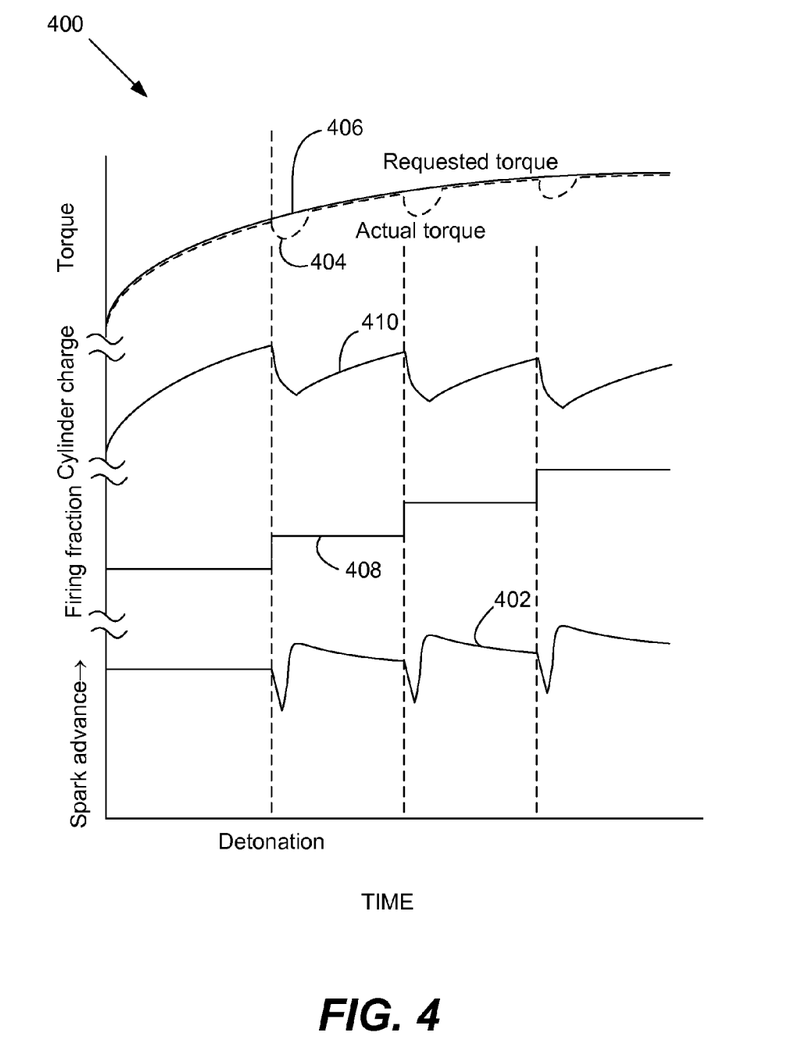
FIG. 4 is a graph illustrating example engine characteristics in a skip fire engine control system according to a particular embodiment of the present invention.

Referring next to FIGS. 3 and 4, example graphs of various engine parameters will be described. The graphs help illustrate the differences in performance between a conventional, prior art engine and an engine operated using the techniques described above. It should be appreciated that FIGS. 3 and 4 are provided only for illustrative purposes, and that the engine parameters may depart from what is shown in the graph.

FIG. 3 is a graph including multiple curves representing the operation of a conventional, prior art engine. The illustrated curves 306, 304, 310 and 302 indicate changes in the requested torque (e.g., based on the accelerator pedal position), the actual torque delivered by the engine, cylinder load, and the spark timing, respectively. The horizontal axis of the graph 300 represents time. As the requested torque 306 increases the cylinder load or charge increases proportionally to match the requested torque. The graph 300 indicates that when a detonation occurs, the spark timing is retarded (curve 302). As previously discussed, many prior art engine systems retard the spark when a detonation is detected in order to help reduce heat and pressure in the corresponding working chamber. It should be noted however, that at the time of the detonation, the curve 304 representing the actual or delivered torque drops below that of the curve 306 representing the requested torque. In other words, the retarding of the spark timing causes the torque output of the engine to drop. This causes the vehicle to be less responsive to the driver and may encourage the driver to depress the accelerator pedal further increasing the cylinder load in an attempt to obtain more torque from the engine. This act, however, may increase the likelihood of a future detonation and counteract the purpose of retarding the spark timing.

FIG. 4 illustrates a different approach to mitigating detonation according to a particular embodiment of the present invention. The illustrated graph 400 represents the operation of an engine in a skip fire manner (e.g., in accordance with method 200 of FIG. 2 and engine controller 100 of FIG. 1.) In the example graph 400, multiple curves 406, 404, 410, 408 and 402 representing requested torque, actual (delivered) torque, cylinder charge (i.e., mass air charge), firing fraction and spark timing, respectively, are shown. The graph 400 indicates that when a detonation is detected, the spark timing is briefly retarded (curve 402). After the initial spark retardation the spark timing increases due to the decreased cylinder load. As the cylinder load increases the spark advance drops. Due to the retarding of the spark timing, there can be a small, temporary drop in the actual torque (curve 404) relative to the requested torque (curve 406). In practice this drop may be unperceivable to the driver, but the drop is exaggerated in FIG. 4 for clarity. In response to the detection of the detonation, the firing fraction is increased (curve 408). The increase in the firing fraction helps compensate for the lost torque. Thus, the curve 404 representing the actual torque realigns with and closely matches the curve 406 representing the requested torque. This is in contrast to curve 304 of FIG. 3, in which the actual torque drops below the requested torque for an extended time interval. The increase in the firing fraction also corresponds with a decline in the mass air charge, as shown by the cylinder charge curve 410. As shown by curve 402, since less air is delivered to the working chamber, the spark timing is further advanced.

The adjustment of the firing fraction may be performed in a variety of ways, depending on the needs of a particular application. In some embodiments, for example, the firing fraction calculator 102 selects each firing fraction from a predefined set or library of predetermined firing fractions. The firing fractions may be stored in any suitable data structure, such as one or more lookup tables. In other embodiments, the firing fraction is generated dynamically using a suitable algorithm.

Any and all of the described components may be arranged to refresh their determinations/calculations very rapidly. In some preferred embodiments, these determinations/calculations are refreshed on a firing opportunity by firing opportunity basis although, that is not a requirement. In some embodiments, for example, the monitoring of the engine for a detonation and the adjustment of the firing fraction based on detonation detection (e.g., one or more of steps 202, 204, 206 and 208 of FIG. 2) is performed on a firing opportunity by firing opportunity basis. An advantage of firing opportunity by firing opportunity operation of the various components is that it makes the engine controller very responsive to changed inputs and/or conditions. Although firing opportunity by firing opportunity operation is very effective, it should be appreciated that the various components can be refreshed more slowly while still providing good control (e.g., the firing fraction adjustment may be performed every revolution of the crankshaft, every two or more firing opportunities, etc.).

The previously described embodiments relate to an engine controller 100 responding to the detection of detonation by increasing the firing fraction. In a further embodiment of the present invention the engine controller 100 may adjust the firing fraction in a longer-term manner. In various embodiments, engine controller 100 may have a table that lists the appropriate value of spark advance for any given engine speed and cylinder load. The resultant firing fraction, which delivers the requested torque under these conditions, may be defined as the base firing fraction. If at a certain engine speed and cylinder load the listed spark advance routinely causes detonation then a correction factor may be applied to the table reducing spark advance for those particular conditions. The engine controller 100 can concomitantly adjusted the firing fraction so that the engine delivers the requested torque. Effectively the engine controller 100 has learned that a certain spark advance is no longer appropriate for a given engine speed and cylinder load and proactively made the necessary adjustments such as increasing the FF and substituting the base firing fraction with a new increased firing fraction in the long term adaptation, thus reducing the need for the adjustment process described in FIG. 4. At prescribed reset intervals, for example, after each engine restart, each gasoline fill up, and/or after every 30 minutes of engine operation the engine controller may attempt to revert to base FF and advance the spark towards its normal table value. If the spark advancement is achieved without detonation, the original base firing fraction set point is restored as the new operating point. If the base firing fraction with nominal spark advance causes detonation, the revised firing fraction set point is retained as the operating point. It should be appreciated that the aforementioned reset intervals are exemplary only and other interval criteria may be used.

The invention has been described primarily in the context of detecting detonations in the skip fire operation of 4-stroke piston engines suitable for use in motor vehicles. However, it should be appreciated that the described applications are very well suited for use in a wide variety of internal combustion engines. These include engines for virtually any type of vehicle—including cars, trucks, boats, aircraft, motorcycles, scooters, etc.; and virtually any other application that involves the firing of working chambers and utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkinson cycle engines, Wankel engines and other types of rotary engines, mixed cycle engines (such as dual Otto and diesel engines), hybrid engines, radial engines, etc. It is also believed that the described approaches will work well with newly developed internal combustion engines regardless of whether they operate utilizing currently known, or later developed thermodynamic cycles. The current invention is also applicable to boosted engines, such as engines having a supercharger or turbocharger.

The described embodiments work well with skip fire engine operation. In some implementations, working chambers are fired under close to optimal conditions. That is, the throttle may be kept substantially open and/or held at a substantially fixed position and the desired torque output is met (primarily) by varying the firing frequency. In some embodiments, during the firing of working chambers (e.g., during all the steps in method 200 of FIG. 2), the throttle is positioned to maintain a manifold absolute pressure greater than 70, 80, 90 or 95 kPa. In various implementations, the described techniques for mitigating detonation may be particularly useful, since firing working chambers under (near) full throttle can otherwise increase the likelihood of a detonation.

It should be also appreciated that any of the operations described herein may be stored in a suitable computer readable medium in the form of executable computer code. The operations are carried out when a processor executes the computer code. Such operations include but are not limited to any and all operations performed by the method 200 of FIG. 2, the firing fraction calculator 102, the firing timing determination module 106, the firing control unit 110, the power train parameter adjusting module 108, the engine controller 100, or any other module, component or controller described in this application.

Although only a few embodiments of the invention have been described in detail, it should be appreciated that the invention may be implemented in many other forms without departing from the spirit or scope of the invention. There are several references to the term, firing fraction. It should be appreciated that a firing fraction may be conveyed or represented in a wide variety of ways. For example, the firing fraction may take the form of a firing pattern, sequence or any other firing characteristic that involves or inherently conveys a percentage of firings. FIG. 4 illustrates various changes in different engine parameters over time. It should be appreciated that FIG. 4 is intended to be diagrammatic and that the present invention also contemplates engine operations that are not in accordance with the curves illustrated in the figure. Therefore, the present embodiments should be considered illustrative and not restrictive and the invention is not to be limited to the details given herein.

What is claimed is:

1. A method for mitigating detonation and managing torque in a spark ignition internal combustion engine operated in a skip fire manner, the engine having a plurality of working chambers, the method comprising:
   operating the working chambers of the engine in a skip fire manner to deliver a desired torque based on a firing fraction;
   detecting one or more detonations in a working chamber of the engine;
   in response to the detection of the one or more detonations, retarding spark timing for one or more of the working chambers;
   automatically increasing the firing fraction used to operate the engine such that the increased firing fraction helps compensate for torque lost due to the retarding of the spark timing; and
   operating the working chambers of the engine in a skip fire manner based on the increased firing fraction to deliver the desired torque.

2. A method as recited in claim 1 wherein during the operation of the engine, a throttle is positioned to maintain a manifold absolute pressure greater than at least one selected from the group consisting of 70 kPa, 80 kPa, 90 kPa and 95 kPa.

3. A method as recited in claim 1 further comprising dynamically adjusting the firing fraction in response to the detection of a detonation on a firing opportunity by firing opportunity basis.

4. A method as recited in claim 1 wherein the retarding of the spark timing involves retarding the spark timing to a different degree for at least two working chambers based on different characteristics of detonations in the at least two working chambers.

5. A method as recited in claim 1 wherein the increasing of the firing fraction is performed automatically in response to the detection of the detonation such that the increasing of the firing fraction is not in response to driver input.

6. A method as recited in claim 1 wherein the increasing of the firing fraction causes a decrease in mass air charge, thereby helping to reduce risk of further detonations.

7. A method as recited in claim 1 further comprising:
   selecting a first firing fraction from a library of predefined firing fractions;
   operating the engine based on the first firing fraction;
   selecting a second firing fraction from the library of predefined firing fractions, the second firing fraction being greater than the first firing fraction, the selection of the second firing fraction being performed in response to the detection of the one or more detonations in the engine and the retarding of the spark timing.

8. An engine controller for mitigating detonation and managing torque in a spark ignition engine operated in a skip fire manner, the engine having a plurality of working chambers, the engine controller comprising:
   a firing fraction calculator arranged to determine a first firing fraction used to operate the working chambers of the engine in a skip fire manner to deliver a desired torque;
   a firing control unit arranged to operate the working chambers of the engine in a skip fire manner to deliver the desired torque based on the first firing fraction;
   a detonation detection module arranged to detect one or more detonations in the engine; and
   a power train parameter adjustment module arranged to retard spark timing for one or more of the working chambers in response to the detection of the one or more detonations wherein:
   the firing fraction calculator is further arranged to automatically determine a second firing fraction that is higher than the first firing fraction wherein the second firing fraction is generated in response to the detection of the detonation in the engine; and
   the firing control unit is further arranged to operate the working chambers of the engine in a skip fire manner based on the second firing fraction to help deliver the desired torque and compensate for torque lost due to the retarding of the spark timing.

9. An engine controller as recited in claim 8 wherein the detonation detection module includes one or more sensors that are positioned on the engine and arranged to monitor vibrations propagating through the engine.

10. An engine controller as recited in claim 8 wherein the firing fraction calculator is arranged to dynamically adjust a firing fraction in response to the detection of a detonation on a firing opportunity by firing opportunity basis.

11. An engine controller as recited in claim 8 wherein:
   the power train parameter adjusting module and the fire control unit are arranged to position a throttle to maintain a manifold absolute pressure of greater than at least one selected from the group consisting of 70 kPa, 80 kPa, 90 kPa and 95 kPa.

12. An engine controller as recited in claim 8 wherein the determination of the second firing fraction is performed automatically in response to the detection of the detonation such that the determination of the second firing fraction is not in response to driver input.

13. An engine controller as recited in claim 8 wherein:
   the firing fraction calculator is arranged to select the first and second firing fractions from a library of predefined firing fractions.

14. A computer readable storage medium that includes executable computer code embodied in a tangible form operable to mitigate detonation and manage torque in a skip fire engine control system including an engine having a plurality of working chambers wherein the computer readable medium includes:
   executable computer code operable to operate the working chambers of the engine in a skip fire manner to deliver a desired torque based on a firing fraction;
   executable computer code operable to detect one or more detonations in the engine;
   executable computer code operable to retard spark timing for one or more of the working chambers in response to the detection of the one or more detonations;
   executable computer code operable to automatically increase the firing fraction used to operate the engine such that the increased firing fraction helps compensate for torque lost due to the retarding of the spark timing; and
   executable computer code operable to operate the working chambers of the engine in a skip fire manner based on the increased firing fraction to deliver the desired torque.

15. A computer readable medium as recited in claim 14, further comprising executable computer code operable to dynamically adjust the firing fraction in response to the detection of a detonation on a firing opportunity by firing opportunity basis.

16. A computer readable medium as recited in claim 14, further comprising executable computer code operable to retard the spark timing to a different degree for at least two working chambers based on different characteristics of detonations in the at least two working chambers.

17. A computer readable medium as recited in claim 14 wherein the increasing of the firing fraction is performed automatically in response to the detection of the detonation such that the increasing of the firing fraction is not in response to driver input.

18. A computer readable medium as recited in claim 14 further comprising:
   executable computer code operable to select a first firing fraction used to operate the engine in a skip fire manner prior to the detection of the one or more detonations wherein the first firing fraction is selected from a predetermined set of firing fractions; and
   executable computer code operable to select a second firing fraction from the predetermined set of firing fractions, the second firing fraction being higher than the first firing fraction and used to operate the engine in a skip fire manner after and in response to the detection of the one or more detonations.

* * * * *